United States Patent
Skrabin et al.

(10) Patent No.: US 7,649,140 B2
(45) Date of Patent: Jan. 19, 2010

(54) PHOTOVOLTAIC MODULE WITH FULL UTILIZATION OF SURFACE AREA

(75) Inventors: Igor Lvovich Skrabin, Yarralumla (AU);
Michael J. Sundman, Basel (CH);
Gavin Edmund Tulloch, Queanbeyan (AU); George Phani, Illawong (AU);
Sylvia Medlyn Tulloch, Queanbeyan (AU)

(73) Assignee: Dyesol Ltd., Queanbeyan (AU)

( * ) Notice: Subject to any disclaimer, the term of this patent is extended or adjusted under 35 U.S.C. 154(b) by 35 days.

(21) Appl. No.: 11/629,723

(22) PCT Filed: Jun. 15, 2005

(86) PCT No.: PCT/AU2005/000844

§ 371 (c)(1),
(2), (4) Date: Jul. 22, 2008

(87) PCT Pub. No.: WO2005/124802

PCT Pub. Date: Dec. 29, 2005

(65) Prior Publication Data

US 2009/0000655 A1   Jan. 1, 2009

(30) Foreign Application Priority Data

Jun. 15, 2004   (AU) ............................ 2004903198

(51) Int. Cl.
*H01L 25/00*   (2006.01)
(52) U.S. Cl. .................. 136/255; 136/243; 136/263
(58) Field of Classification Search .............. 136/243, 136/255, 263
See application file for complete search history.

(56) References Cited

U.S. PATENT DOCUMENTS

| | | | |
|---|---|---|---|
| 4,927,721 A | 5/1990 | Gratzel et al. | |
| 5,525,440 A | 6/1996 | Kay et al. | |
| 6,297,900 B1 | 10/2001 | Tulloch et al. | |
| 6,555,741 B1 | 4/2003 | Hopkins et al. | |
| 6,652,904 B1 | 11/2003 | Phani et al. | |
| 2003/0013008 A1* | 1/2003 | Ono ......................... | 429/111 |
| 2004/0074531 A1 | 4/2004 | Matsui et al. | |

FOREIGN PATENT DOCUMENTS

| | | |
|---|---|---|
| EP | 1 513 171 | 3/2005 |
| WO | WO 99/63599 | 12/1999 |
| WO | WO 2005/114686 | 12/2005 |

* cited by examiner

*Primary Examiner*—Jeffrey T Barton
(74) *Attorney, Agent, or Firm*—Davis & Bujold, P.L.L.C.

(57) ABSTRACT

A photovoltaic module comprising: (i) three or more substrates (1, 2, 3) arranged in a closed-spaced parallel relationship to one another, the substrates comprising: a center substrate (2) having first and second faces; a first outer substrate (1) having an inner and outer face, wherein the inner face and the first face of the center substrate are juxtaposed; and a second outer substrate (3) having an inner and outer face, wherein the inner face and the second face of the center substrate are juxtaposed, (ii) front photovoltaic devices (A, B, C) are formed between the first outer substrate (1) and the first face of the center substrate (2), (iii) connecting and/or dividing method (11) are placed between at least one pair of the front devices, and (iv) rear photovoltaic devices (D, E) are formed between the second outer substrate (3) and the second face of the center substrate (2), characterized by: (v) the front and rear photovoltaic devices are offset in such a way that connecting and dividing methods (11) of the front devices (A, B, C) oppose the active photovoltaic regions of the rear devices (D, E).

19 Claims, 3 Drawing Sheets

PHOTOVOLTAIC MODULE WITH FULL UTILIZATION OF SURFACE AREA

TECHNICAL FIELD

This invention relates to multi-cell photovoltaic devices (photovoltaic modules) and to Combined Energy Generation & Storage (CEGS) devices. More particularly this Invention relates to Nano Dye Solar Cells (NDSC) and to photovoltaic modules based on NDSC technology.

A variety of photovoltaic devices are available for conversion of energy of electromagnetic radiation to electrical energy. These include a conventional solid-state devices (see M. Green *Third generation photovoltaics: concepts for high efficiency at low cost*, The Electrochemical Society Proceedings. Vol. 2001-10, p. 3-18) and more recently developed NDSC devices Examples of the NDSC devices of the type concerned are disclosed in the following US patents:

U.S. Pat. No. 4,927,721, Photoelectrochemical cell; Michael Graetzel and Paul Liska, 1990.
U.S. Pat. No. 5,525,440, Method of manufacture of photo-electrochemical cell and a cell made by this method; Andreas Kay, Michael Graetzel and Brian O'Regan, 1996.
U.S. Pat. No. 6,297,900, Electrophotochromic Smart Windows and Methods, G. E. Tulloch and I. L. Skryabin, 1997.
U.S. Pat. No. 6,555,741, Methods to implement interconnects in multi-cell regenerative photovoltaic photoelectrochemical devices, J. A. Hopkins, G. Phani, I. L. Skryabin, 1999.
U.S. Pat. No. 6,652,904, Methods to manufacture single cell and multi-cell regenerative photoelectrochemical devices, J. A. Hopkins, D. Vittorio, G. Phani, 1999.

Examples of the CEGS devices are disclosed in the International Patent Application PCT/AU2004/000689—Nanophotocapacitor, I. L. Skryabin and S. M. Tuiloch, 21 May 2004.

BACKGROUND TO THE INVENTION

Many thin film PV device and, particularly, NDSC devices, as of the type disclosed in the above patents, are capable of being fabricated in a laminate arrangement between two large area substrates without undue expense. One typical arrangement involves two glass substrates, each utilising an electrically conducting coating upon the internal surface of the substrate. Another typical arrangement involves the first substrate being glass or polymeric and utilising an electrically conducting coating upon the internal surface of the substrate, with the second substrate being polymeric or metallic. In some arrangements, the internal surface of said second polymeric substrate is coated with an electrically conducting coating, whereas in other arrangements, said second polymeric substrate comprises a polymeric foil laminate, utilising adjacent electrically conductive material, such as carbon. Also, in some arrangements, the external surface may be a laminated metal film, and in other arrangements, the external surface may be coated by a metal. In other arrangements the substrate is made of metal or metallic mesh or the internal surface of the substrate is coated by metal. At least one of said first and second substrates is substantially transparent to visible light, as is the attached transparent electrically conducting (TEC) coating.

In general, a photovoltaic device comprises active photovoltaic regions, connecting means to connect these regions electrically and dividing means to separate these regions.

In particular, the active photovoltaic regions of NDSC device comprise a working electrode of nanoparticulate dye-sensitised wide band gap semiconductor (e.g. titanium dioxide known as titania) attached to one conductive coating; a counter electrode, typically consisting of a catalytic layer attached to the other conductive coating or to a conductive material; and an electrolyte containing a redox mediator placed between the working and the counter electrodes.

Many NDSC module designs would be advantaged by an increased size of individual NDSC devices. However, such transparent electrical conductors (TEC), which usually comprise a metal oxide(s) or metallic mesh, have relatively high resistivity when compared with normal metal conductors, resulting in higher than sought resistive losses for large area NDSC device, which affects the efficiency of the NDSC device especially in high illumination conditions.

In one arrangement, described in the prior art, these losses are reduced by the use of connecting means such as a pattern of electrically conductive material (ECM) in the form of bus bars, pads, grid of lines or any other pattern on the TEC coating(s) or inlaid or surface laid conductive mesh or wires. The said electrically conducting means occupy certain part of surface of a photovoltaic module, thus reducing area available for the active photovoltaic regions of NDSC. This results in reduction of overall efficiency of NDSC device since only a part of solar radiation incident to the device strikes its active photovoltaic regions.

In another arrangement, described in the prior art, these losses are reduced by forming two or more relatively small separate NDSC devices and separating and connecting them internally within a single NDSC module. Once again, the internal connectors and/or separators between the separate NDSC devices occupy certain part of surface of the photovoltaic module, thus reducing overall efficiency of NDSC device.

OBJECTIVES OF THE INVENTION

It is an objective of this invention to provide a photovoltaic module that will overcome the above-mentioned disadvantages in the art. It is a further objective of the invention to provide a NDSC module with effectively 100% utilization of its surface area. It is another objective of this invention to provide a NDSC module with improved overall light conversion efficiency. It is further objective of this invention to provide a photovoltaic module with combined energy storage and generation properties.

OUTLINE OF INVENTION

This invention is based upon the realisation that although connecting and separating means occupy a certain area of a photovoltaic module, the area occupied by these means (and, in some NDSC designs of the semiconductor electrode, the electrode itself) is partially optically transparent and, thus, solar radiation transmitted directly or by refraction or reflection through this area could be successfully converted into electricity by another photovoltaic device placed behind the said connecting and separating means.

In broad terms, the present invention provides for tandem photovoltaic module that comprises at least two separate or internally connected photovoltaic devices, placed one behind another in such a way that interconnecting or dividing means of the front device oppose the active photovoltaic region of the rear device.

The invention provides for photovoltaic module comprising the following:

Three or more substrates arranged in a closed-spaced parallel relationship to one another, the substrates comprising:

a center substrate having first and second faces, or two substrates back to back having displayed first and a second faces, a first outer substrate having an inner and outer face, the first outer substrate being arranged so that the inner face and the first face are juxtaposed, And a second outer substrate having an inner and outer face, the second outer substrate being arranged so that the said inner face of second substrate and said second face are juxtaposed, front photovoltaic devices are formed between said first outer substrate and the $1^{st}$ face of said centre substrate, rear photovoltaic devices are formed between said second outer substrate and the old face of said centre substrate said front and rear photovoltaic devices are offset in such way that connecting and dividing means of the front devices oppose at least partly the active photovoltaic areas of the rear devices.

In one aspect, the invention provides photovoltaic module, wherein:

Said front photovoltaic devices are internally connected to form a front two terminal power source Said rear photovoltaic devices are internally connected to form a rear two terminal power source The photovoltaic module according to this aspect of the invention has 4 electrical terminals (4-terminal module)

We have found it useful to implement internal connections between the front and the rear photovoltaic devices to form a joint two terminal power source. The invention provides for parallel, series and mixed parallel-series connections between the front and the rear device within the joint two terminal power source.

In one embodiment hole(s) are made in the inner substrate(s) to enable these electrical connections between the front and the rear NDSC devices. One or more electrical conductors (e.g. pin, wire, solder, conductive paste) are inserted in each said hole(s) and/or said hole(s) are filled with an electrically conductive material or non-conducting material (e.g. ceramic glaze), thereby forming an electrical connection between said electrical conductor(s) and said electrically conducting material, and forming a bond between said electrical conductor(s) and said substrates and sealing said hole(s).

In yet another aspect, the invention provides for incorporation of a diode element in electrical path between the front and the rear photovoltaic devices. The diode element is electrically connected to both front and rear devices and formed in such a way, that electrical energy generated by the front devices could not be dissipated in the rear devices, thus preventing loss of power when the rear devices produce insufficient voltage. The diode element comprises at least 2 layers, the electrical properties of which are adjusted to form a rectifying p-n junction on interface between these 2 layers.

In one embodiment the said 2 layers of the diode layers are based on the semiconducting oxide. One of these two layers is doped with donor—, and another—with acceptor dopant.

In further embodiment the said semiconducting oxide is the same material as used in the NDSC device for the formation of dye sensitised nanoparticulate semiconducting layer.

The invention specifically provides for utilisation of NDSC devices. From one aspect of the invention, the photovoltaic module comprises NDSC devices in combination with other photovoltaic devices (e.g. thin film Si based devices). From another aspect—both rear and front photovoltaic devices are NDSC devices.

If only front (or only rear) devices are NDSC devices, a dye in these NDSC devices is selected to be optically complimentary to absorption characteristics of the other devices (e.g.—to absorption characteristics of Si p-n junction).

The invention provides for NDSC module, when both the rear and the front photovoltaic devices are NDSC. In one embodiment according to this aspect of the invention a photosensitiser (dye) utilised in said rear devices is optically complementary to the photosensitiser utilised in the front devices. This implies that front and rear dyes are selected in such way that their optical absorbance functions when overlapped cover a more substantial part of solar spectrum. In one example, the front dye absorbs preferentially in blue part of the spectrum, while being substantially transparent to the red part of the spectrum, which is successfully absorbed by the rear dye.

In one type of electrical connections the front NDSC devices are connected in parallel with the rear NDSC devices. In this case the front and rear devices will operate under the same voltage. To ensure that the voltage of rear devices is the same as that of the front devices, while the front device receives the larger proportion of the solar radiation, and, thus, produce higher current, the invention provides for adjustment of electrolyte composition of the rear devices. This adjustment may be performed by varying relative concentrations of the redox couple components, by varying chemical composition of a solvent, or by varying concentration or composition of additives to the electrolyte. In this embodiment the invention provides for two different electrolytes one—for the front devices and another—for the rear devices, while not precluding the use of the same electrolyte and modifying other characteristics such as cell thickness and/or characteristics of the semiconductor. These electrolytes are selected in such a way that voltage of the front NDSC device, which is under solar radiation incident to the outer surface of the $1^{st}$ outer substrate or a subsequent protective surface of the first outer substrate is equal (or close to) the voltage of the rear device, which receives solar radiation attenuated by the front device and its interconnecting and separating means.

In further embodiment, the width of the active photovoltaic regions of the rear devices is adjusted to ensure that the whole regions of the rear device are substantially uniformly illuminated by the solar radiation. This is especially important when the rear and the front devices are connected in series and, therefore, electrical current in the front devices is equal to the electrical current in the rear devices.

It is essential that the $1^{st}$ outer substrate and the inner substrate are substantially transparent. The invention provides for a wide range of materials that could be utilised as the substrates for photovoltaic module. In one embodiment at least one of the substrates is made of flexible material. Typically, the $1^{st}$ outer substrate and the central substrate are made of plastic material, whereas the $3^{rd}$ substrate is metallic or metal/polymer laminate. In some realisations, the invention provides for use of metallic mesh in any of the three substrates, however, in the preferred realisation the metallic mesh is used only in the $1^{st}$ outer and in the central substrate.

In further embodiment in accordance with this aspect of the invention at least one of the substrates is made of glass.

In further aspect, the invention provides for energy storage within the NDSC device. NDSC devices are capable for storing energy. The energy storage properties could be enhanced by modification of titania layer, and/or electrolyte and by adding carbon particles. Usually this modifications result in improving of energy storage In one embodiment, the front devices are predominantly photovoltaic devices, whereas the rear devices are predominantly energy storage devices.

In another embodiment, the front devices are photovoltaic devices, whereas the rear devices are energy storage devices (e.g. capacitors, batteries, etc.).

In yet further aspect of the invention the front and rear NDSC devices are built on one substrate in a set of subsequent deposition of device layers and of electrical connectors (e.g. TEC layer, connecting means), thus providing for monolithic integrated arrangement.

DESCRIPTION OF EXAMPLES

Having portrayed the nature of the present invention, a number of particular examples will now be described by way of illustration only. In the following description, reference will be made to the accompanying drawings in which.

Figure 1:
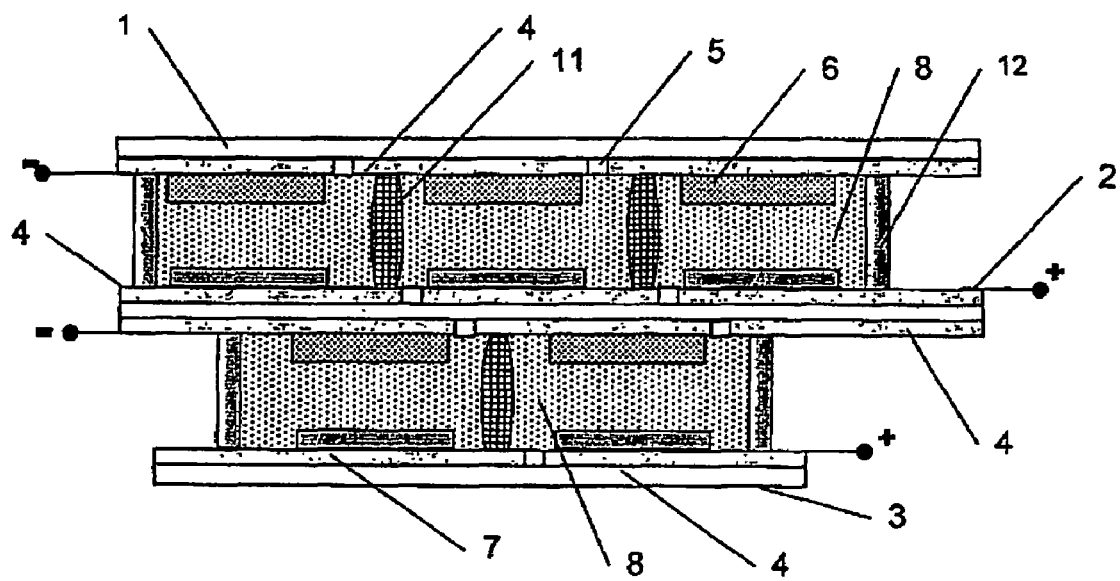
FIG. 1 is a diagrammatic cross-sectional view (not to scale) of 4-terminal NDSC device comprising the first example of the invention.

Referring to FIG. 1, the device is formed between a $1^{st}$ outer substrate 1, centre substrate 2 and a $2^{nd}$ outer substrate 3. Inner surfaces of both $1^{st}$ and $2^{nd}$ outer substrates and both faces of the centre substrate are coated by a layer of Transparent Electronic Conductor (TEC) 4. The TEC layer comprise fluorine doped tin oxide. Each TEC coating is divided into separate electrically isolated regions by isolation lines 5, produced by laser grooving. Separated NDSC devices are formed between the opposing pairs of these regions—between inner face of the $1^{st}$ outer substrate and the $1^{st}$ face of the centre substrate (front devices) and between the inner face of the $2^{nd}$ outer substrate and the $2^{nd}$ face of the centre substrate (rear devices). Each of these devices comprises nanoparticulate dye-sensitised layer of titania (working electrode) 6, Pt-based catalytic layer (counter electrode) 7 and electrolyte 8. The front devices are connected in series by connecting means 11 (tungsten conducting particles embedded into a polymeric matrix) to form a front pair of electrical terminals, whereas the positive front terminal is formed on the $1^{st}$ face of the centre substrate and the negative front terminal—on the inner face of the $1^{st}$ outer substrate. The devices are sealed from environment by separating (dividing) means 12.

Similarly, the rear devices are connected in series to form the second rear pair of electrical terminals, with a positive rear terminal being placed on the inner face of the $2^{nd}$ outer substrate and the negative rear terminal on the $2^{nd}$ face of the centre substrate.

The working electrodes (active photovoltaic regions) of the rear devices are placed behind the connecting means of the front devices.

A part of the solar radiation incident to the outer face of the $1^{st}$ outer substrate is absorbed by the working electrodes of the front devices and converted into electricity available at the front pair of the terminals. The remaining part of the solar radiation passes through the centre substrate and after insignificant losses is absorbed by the working electrodes of the rear devices creating electricity available at the rear pair of terminals.

Figure 2A:
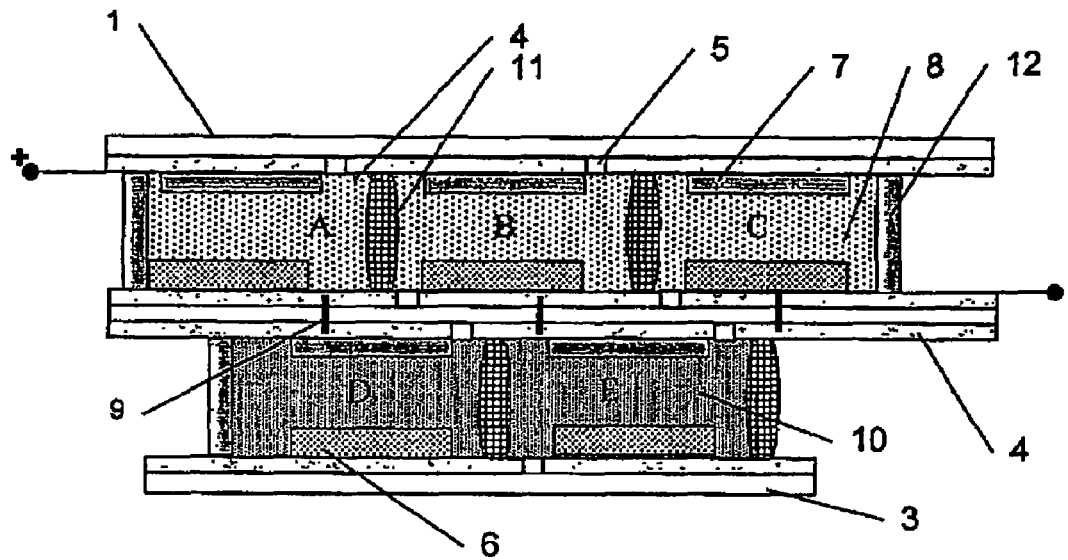
FIG. 2a is a diagrammatic cross-section illustrating the physical construction (not to scale) of the 2-terminal PV device comprising the second example of the present invention.

Referring to FIG. 2a, the device of the second example is formed similarly to the device of the first example. To reduce number of external terminals internal electrical connection(s) 9 are made through the central substrate. In addition, to ensure that voltage of the rear device is equal or similar to the voltage of the front devices an electrolyte 10 is utilised in the rear devices. This rear electrolyte 10 is different from the electrolyte 8 implemented in the front devices in that its chemical composition results in voltage higher than that produced by the front electrolyte under the same irradiation. Typically the rear devices receive less irradiation than the front devices so, difference in electrolyte chemical composition ensures that the rear and the front devices produce the same voltage.

Figure 2B:
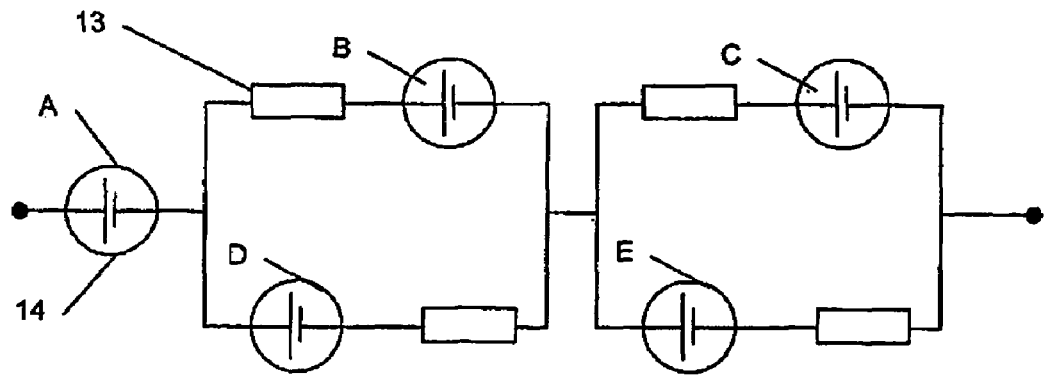
FIG. 2b is an equivalent electrical circuit diagram of the PV device manufactured in accordance with the second example of the present invention.

Referring to FIG. 2b each NDSC device is denoted by number 14 and resistance of the connections means—by number 13. A, B & C are the front devices and D & E are the rear devices.

Figure 3A:
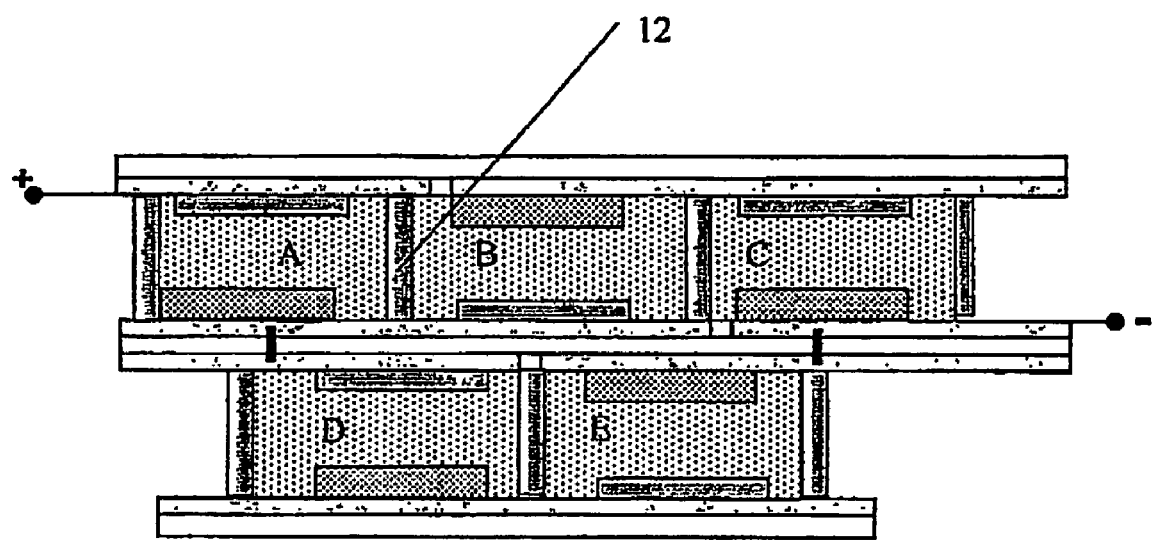
FIG. 3a is a diagrammatic cross-section illustrating the physical construction (not to scale) of the 2-terminal PV device comprising the third example of the present invention.

Referring to FIG. 3a, the two-terminal device of the third example is formed without the connecting means. This is achieved by forming adjacent working and counter electrodes on separated regions of TEC coated faces of each substrate. The devices are then separated by the separating (dividing) means 12 made of polymeric impermeable materials (e.g. modified silicone)

Figure 3B:
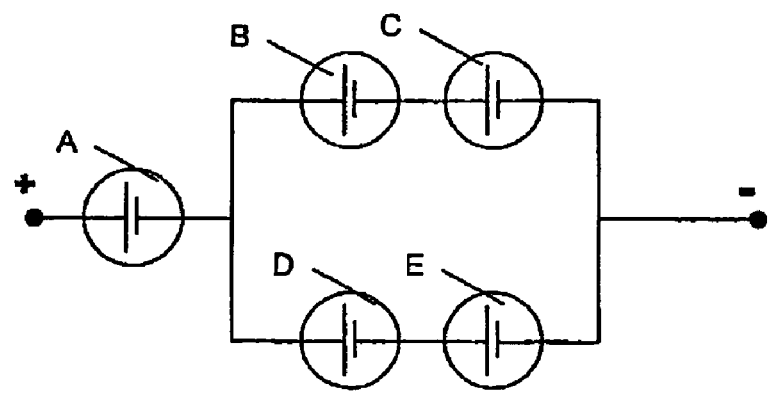
FIG. 3b is the equivalent electrical circuit diagram of the PV device manufactured in accordance with the third example of the present invention.

Referring to FIG. 3B, the equivalent circuit diagram shows electrical connections between the front devices A, B & C and rear devices D & E.

The invention claimed is:

1. A photovoltaic module comprising:
    at least three substrates arranged in a closed-spaced parallel relationship to one another, the substrates comprising:
        a center substrate having first and second faces or two substrates back to back having displayed first and second faces,
        a first outer substrate having an inner and outer face, the first outer substrate being arranged so that the inner face of the first outer substrate and the first face are juxtaposed, and
        a second outer substrate having an inner and outer face, the second outer substrate being arranged so that the inner face of the second outer substrate and the second face are juxtaposed;
    front photovoltaic devices formed between the first outer substrate and the first face;
    connecting and/or dividing means placed between at least one pair of the front photovoltaic devices; and
    rear photovoltaic devices formed between the second outer substrate and the second face;
    wherein the front and rear photovoltaic devices are offset in such a way that the connecting and/or dividing means oppose active regions of the rear photovoltaic devices.

2. The photovoltaic module according to claim 1, wherein the front photovoltaic devices are internally connected to form a front two terminal power source and the rear photovoltaic devices are internally connected to form a rear two terminal power source.

3. The photovoltaic module according to claim 1, wherein the front photovoltaic devices and the rear photovoltaic devices are internally connected to form a joint two terminal power source.

4. The photovoltaic module according to claim 3, wherein diode layers are included in an electrical path between the front and the rear photovoltaic devices.

5. The photovoltaic module according to claim 4, wherein the diode layers are based on a semiconducting oxide.

6. The photovoltaic module according to claim 3, wherein at least one hole is made through both of the first and second faces to enable electrical connections between the front and the rear photovoltaic devices.

7. The photovoltaic module according to claim 6, wherein at least one electrical conductor is inserted in the at least one hole.

8. The photovoltaic module according to claim 6, wherein the at least one hole is filled with an electrically conductive material.

9. The photovoltaic module according to claim 3, wherein a width of the active regions of the rear photovoltaic devices is less than a width of active regions of the front photovoltaic devices.

10. The photovoltaic module according to claim 1, wherein at least one of the front or rear photovoltaic devices is a nano dye solar cell (NDSC) device comprising a dye sensitized nanoparticulate layer of a wide band gap semiconductor and an electrolyte layer.

11. The photovoltaic module according to claim 10, wherein the rear photovoltaic devices are said NDSC devices with enhanced energy storage properties.

12. The photovoltaic module according to claim 10, wherein the rear photovoltaic devices are said NDSC devices and the dye utilized in the rear devices is optically complementary to active layers of the front photovoltaic devices.

13. The photovoltaic module according to claim 10, wherein all the rear photovoltaic devices and all the front photovoltaic devices are said NDSC devices.

14. The photovoltaic module according to claim 13, wherein the dye utilized in the rear photovoltaic devices is optically complimentary to the dye utilized in the front photovoltaic devices.

15. The photovoltaic module according to claim 14, wherein the dye utilized in the front photovoltaic devices absorbs light predominantly in the blue part of the solar spectrum and the dye utilized in the rear photovoltaic devices absorbs at least in the red part of the solar spectrum.

16. The photovoltaic module according to claim 13, wherein the front NDSC devices are formed on the first face and the rear NDSC devices are formed on the second face.

17. The photovoltaic module according to claim 13, wherein the front NDSC devices are connected in parallel with the rear NDSC devices.

18. The photovoltaic module according to claim 17, wherein the electrolyte layer of the rear NDSC devices has a chemical composition different than the electrolyte layer of the front NDSC devices.

19. The photovoltaic module according to claim 18, wherein a concentration of a redox couple in the electrolyte layer of the rear NDSC devices is less than a concentration of a redox couple in the electrolyte layer of the front NDSC devices.

* * * * *